Nov. 5, 1946.                S. BERKOFF ET AL                2,410,703
                        ELECTRON DISCHARGE CIRCUIT
                           Filed Sept. 5, 1942
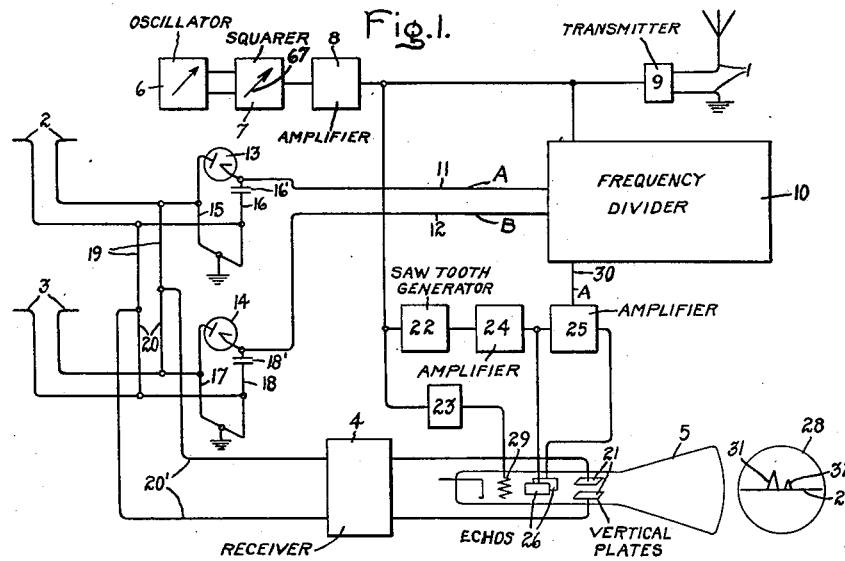
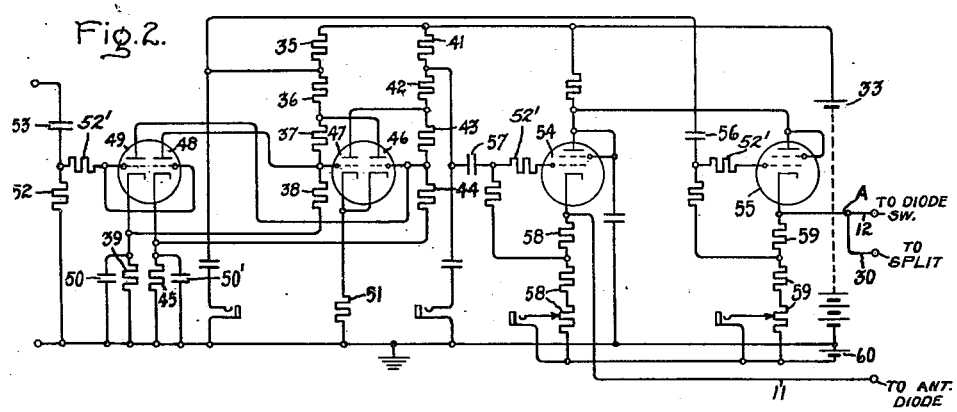
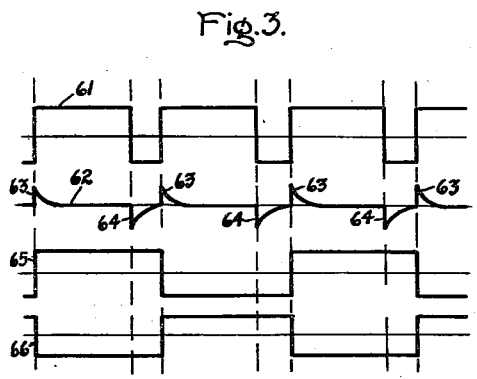
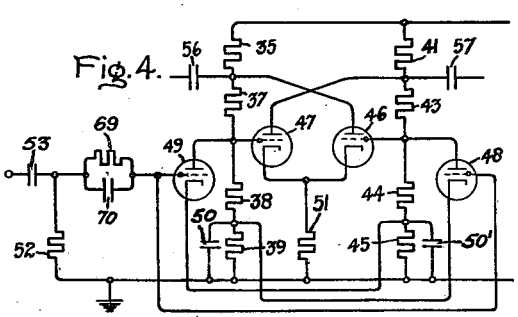
Inventors:
Seymour Berkoff,
Robert B. Dome,
by Harry E. Dunham
Their Attorney.

Patented Nov. 5, 1946

2,410,703

UNITED STATES PATENT OFFICE 2,410,703

ELECTRON DISCHARGE CIRCUIT

Seymour Berkoff and Robert B. Dome, Bridgeport, Conn., assignors to General Electric Company, a corporation of New York Application September 5, 1942, Serial No. 457,432

5 Claims. (Cl. 250—36)

Our invention relates to electron discharge circuits and more particularly to such circuits for use in the generation of electric pulses under control of desired primary pulses.

More particularly, our invention relates to frequency dividers and it has as one of its objects to provide an improved means for producing from pulses of a certain frequency other pulses rigidly controlled thereby, and having a frequency equal to half of said certain frequency.

Another object of our invention is to provide such a frequency divider in which the pulses of lower frequency have positive and negative portions of equal duration irrespective of the relation between the durations of the positive and negative portions of the primary pulses.

A further object of our invention is to provide a frequency divider in which the frequency of the pulses produced is unaffected by variations in the amplitude of the primary pulses over a wide range of such variations.

Another object of our invention is to produce a frequency divider in which the shape of the output pulses is rigidly predetermined and unaffected by the shape of the primary pulses.

The novel features which we believe to be characteristic of our invention are set forth with particularity in the appended claims. Our invention itself, however, both as to its organization and method of operation, together with further objects and advantages thereof, may best be understood by reference to the following description taken in connection with the accompanying drawing in which Fig. 1 represents an equipment utilizing our invention; Fig. 2 represents the detail circuits of our invention; Fig. 3 represents certain characteristics pertaining to its operation; and Fig. 4 represents a modification thereof.

Referring to Fig. 1 of the drawing, we have shown therein a radio system such as may be utilized for the determination of the direction and altitude of remote objects such as aircraft, for example. It may comprise a system in which recurrent pulses of radio frequency energy are radiated as from an antenna 1 and received after reflection from the remote object in different antennae 2 and 3. These antennae are arranged one above the other in a vertical plane so that the pulses are received therein with different intensities dependent upon the altitude of the remote reflecting surface. These received pulses are then supplied first from one of these antennae, and then the other, alternately through respective transmission lines 19 and 20, common transmission line 20' and receiving equipment 4 to a pair of deflection plates 21 of a cathode ray oscillograph 5 where they are utilized to produce an indication of the intensities of the pulses as received in the two antennae. The relation between these intensities is a criterion from which the altitude of the remote reflecting surface may be determined.

The radiated pulses may be radiated at a frequency of, for example, 625 cycles per second, and may be controlled in frequency by means of a source of oscillations 6 of that frequency. Oscillations from this source are supplied through equipment 7, which converts these oscillations to oscillations of square wave form, the latter of which may be supplied through a cathode follower amplifier 8 to the transmitter 9, thus synchronizing the transmitter to pulse at the frequency of 6, which transmitter generates the short pulses of radio frequency energy to be radiated from the antennae.

These square pulses are also supplied to a frequency divider 10. This frequency divider, the details of which will later be described in connection with Fig. 2, generates square waves of half of the frequency of the pulses received from amplifier 8 and supplies these half frequency pulses over conductors 11 and 12, in opposite phase, to a pair of diodes 13 and 14 thereby to render these diodes alternately conducting. These diodes serve to bring about the alternate transmission of the received pulses first from antenna 2, and then from antenna 3, etc., to the receiver 4.

The electrodes of each of these diodes are connected to ground through conductors, indicated at 15 and 16 in the case of diode 13, and at 17 and 18 in the case of diode 14, each having a length equal to a quarter of a wave length of the wave to be received. The cathode conductors 16 and 18 are broken by blocking capacitors 16' and 18' respectively in order that the low frequency keying voltages supplied over conductors 11 and 12 are not short circuited to ground. These capacitors nevertheless are adequate effectively to by-pass radio frequency currents. Suitable points on each pair of these conductors are connected to opposite sides of the respective transmission line 19, or 20, extending from the respective antenna whereby when either diode is conducting the corresponding transmission line is effectively short circuited and rendered inoperative. When the diode is rendered non-conducting, very high impedance exists between its electrodes by reason of the quarter wave transmission line 15, 16 or 17, 18 and the transmission line is operative.

In this way reception is had alternately from the two antennae, the received pulses, first from one antenna and then from the other, being supplied over line 20' and through receiver 4, where they are translated in frequency and rectified to produce corresponding unidirectional potentials between the vertical deflection plates 21 of the cathode ray oscillograph.

The point of connection of conductors 15 and 16 to line 19, and similarly the point of connection of conductors 17 and 18 to line 20, are distant from the point of connection of these two lines 19 and 20 to the common line 20' by a quarter of the wave length of the wave to be received. In this way shorting of one of these lines does not materially impair transmission through the other line.

The square wave from amplifier 8 is also supplied to a sawtooth wave generator 22 and to an amplifier 23. The sawtooth wave generated by the generator 22 may be supplied to the input of two cascade-connected amplifiers 24 and 25. The output of the amplifier 24 is displaced in phase by 180 degrees from the output of the amplifier 25 and it is supplied to one of a pair of horizontal deflection plates 26 of the cathode ray oscillograph while the output of the amplifier 25 is supplied to the other of the two deflection plates 26. In this way the cathode ray of the device 5 is deflected horizontally across the fluorescent screen of this device in a straight line indicated at 27 in the circle 28, shown at the right of cathode ray device 5. This circle may be taken to represent the fluorescent screen of this device.

The square wave from cathode follower amplifier 8 is also supplied to the amplifier 23, amplified thereby, and supplied to the control electrode 29 of the cathode ray device to interrupt the cathode ray during the interval of its return trace, i. e. during the interval between positive pulses, whereby the beam is present only during the trace from the left to right, and it is extinguished during the retrace interval from right to left.

The half frequency square wave pulses generated by frequency divider 10 are also supplied over conductor 30 to the amplifier 25 and is added to the sawtooth wave amplified by this device. Since this wave is of frequency only half that of the sawtooth wave amplified by this amplifier, its positive portion is of duration equal to and coincides in time with a full cycle of the sawtooth wave and its negative portion is of duration equal to and coincides with the next succeeding full cycle of the sawtooth wave. This means that the voltage between plates 26, and hence the beam of the cathode ray device, oscillates first about one center, then about a second center, and then the first, and so on.

Since reception is had alternately from the two antennae 2 and 3 at the frequency of the square wave half frequency pulses from frequency divider 10, the reception from one antenna occurs while the ray is deflected about one center and that from the other antenna occurs while it is deflected about the second center. Thus echo pulses received at the same interval after occurrence of the radiated pulses on the two antennae produce different and horizontally separated or displaced vertical deflections of the cathode ray. This is indicated in the circle 28 of Fig. 1 by the triangles 31 and 32. The triangle 31 may represent the deflection produced by an echo of the radiated pulse received from a distant reflecting object, such as an aircraft, as received in antenna 2. The triangle 32 may correspond to the same echo as received in antenna 3.

These deflections 31 and 32 are of different heights corresponding to the intensities of the received echo pulses as they appear in the two antennae. The ratio between the heights of the two deflections, i. e. between the intensities of the pulse as received in the two antennae is one of the criteria from which the altitude of the remote reflecting object may be determined.

In Fig. 2, we have illustrated the equipment, which is represented by the rectangle 10 of Fig. 1, and which generates the square wave pulses of half the frequency of the radiated pulses for control of the diodes 13 and 14 and for control of amplifier 25.

This equipment comprises a source of operating potential 33 across which are connected two series of resistors, one series comprising the resistors 35, 36, 37, 38 and 39, and the other comprising the series 41, 42, 43, 44 and 45. To these resistors are connected a pair of electron discharge devices 46 and 47, both arranged within a single evelope, if desired, and both having their cathodes connected together and through a resistance 51 to the negative side of the source of operating potential 33. The anode of the device 47 is connected between the resistors 42 and 43 and that of the device 46 is connected between the resistors 36 and 37. The control electrode of the device 47 is connected between resistors 37 and 38 and the control electrode of the device 46 is connected between the resistors 43 and 44. These various resistors are so proportioned that when current flows in either of these two discharge devices, the drop in potential produced thereby on resistor 51 and on the resistors 35 and 36, or 41 and 42 as the case may be, is sufficient to render the control electrode of the opposite device sufficiently negative with respect to its cathode to preclude the flow of anode current therein.

Thus, for example, let us assume that the discharge device 46 is conducting. Its anode current flows through resistors 35, 36 and 51. The potential on resistor 51 renders the cathodes of discharge devices 46 and 47 positive with respect to ground and the drop in potential on resistors 35 and 36 lowers the positive potential on the control electrode of device 47 to such an extent that this control electrode is sufficiently negative with respect to the cathode of this device to prevent the flow of current between the anode and cathode of this device.

Of course, if the control electrode of device 47 were now rendered positive for an instant, the flow of current therein and in resistors 41, 42 and 51 would produce a negative voltage on the control electrode of device 46 with respect to the cathode thereof and thus prevent the flow of current in the device. Thus the conditions in the two devices would be reversed. The same would happen if the control electrode of device 46 were rendered negative. Thus when the condition of conductivity or non-conductivity of either device is reversed it reverses these conditions in the other device. The effect in either case is cumulative so that the condition to which the devices are operated by potential applied to either control electrode is maintained until changed by externally applied potential. Thus the device is not an active generator, but is purely passive, responding accumulatively to the applied potentials to produce a static condition which is maintained until changed by appropriate potential applied to one of the two control electrodes.

Potentials for controlling these control electrodes to render the two devices alternately conducting are supplied thereto from amplifiers 48 and 49, which operate as a switching means to supply the received pulses first to one of the devices 46 and 47 and then to the other. The anode of the device 48 is connected directly to the control electrode of device 47 and the anode of the device 49 is connected to the control electrode of device 46. The cathode of the amplifier 48 is connected to a point between resistors 44 and 45 and the cathode of amplifier 49 is connected to a point between resistors 38 and 39, whereby these cathodes are normally positive with respect to ground. The control electrodes of these two devices are connected together and through resistors 52' and 52 to ground.

The square wave from the cathode follower amplifier 8 of Fig. 1 is supplied across condenser 53 and resistance 52. Condenser 53 and resistor 52 form a short time constant RC circuit which serves to differentiate this square wave to produce a sharp positive pulse on resistance 52 at the beginning of each positive portion of the square wave and a sharp negative pulse at the beginning of each negative portion of the square wave.

At the right of the figure are shown two cathode follower amplifiers 54 and 55 which operate to amplify voltages derived from the anode circuits of the two devices 46 and 47. Thus potential variations which appear on resistance 35, for example, are supplied through condenser 56 to the control electrode of amplifier 55 and, similarly, potential variations on resistance 41 are supplied through condenser 57 to the control electrode of amplifier 54. Each of the cathodes of these devices is connected through respective resistors 58 and 59 to the negative terminal of a source of bias potential 60, the positive terminal of which is connected to ground and to the negative side of the source of operating potential 33. Thus the potentials supplied to the control electrodes of these devices are produced respectively in like wave form on the resistors 58 and 59 and are supplied over the conductors 11, 12 and 30, which appear both in Figs. 1 and 2, of the apparatus previously described to effect the control operations above explained.

The resistance 52' in the grid circuit of devices 48 and 49 and, similarly, the resistances 52' in the grid circuits of each of devices 54 and 55 may be of small value but sufficient to prevent possible parasitic oscillations in the grid circuits of these devices. If desired, any or all of these resistances may be omitted from the circuit.

The operation of the structure illustrated in Fig. 2 may now be more completely explained. Let us assume again that the discharge device 46 is conducting and that the current flowing therein produces a large voltage upon resistances 35, 36 and 51. The voltage on resistance 51 renders the cathodes of devices 46 and 47 positive with respect to ground and the voltage on resistors 35 and 36 reduces the positive potential on the control electrode of device 47. This in turn renders the grid of discharge device 47 negative with respect to the cathode thereof and prevents current from flowing in this device. The drop in potential on resistances 35 and 36 also reduces the positive voltage which otherwise would appear on resistance 39 and hence the negative potential between the control electrode and cathode of amplifier 49. This conditions this amplifier for operation. Since no current flows in device 47, a large potential exists upon resistance 45 and between the control electrode and cathode of amplifier 48 whereby the control electrode of discharge device 48 is strongly negative with respect to the cathode and this device is inoperative.

Under this condition the control electrode of device 49 may be negative with respect to its cathode by 10 volts, for example, whereas the control electrode of device 48 may be negative with respect to its cathode by as much as 25 volts or more. Now if a positive pulse appears upon the control electrodes of the two devices 48 and 49 greater than 10 volts but less than 25, current is produced in the anode of the amplifier 49 but not in amplifier 48. This current, of course, flows in the resistances 41, 42, 43 and 39, thereby reducing the positive potential with respect to ground on the control electrode of device 46 and rendering that device non-conductive. This in turn reduces the potential drop on resistors 35 and 36 previously produced by current in device 46 and increases the positive potential with respect to ground on the control electrode of device 47 thereby rendering that device conductive. This in turn reverses the potential conditions on the resistances 39 and 45 increasing that on resistance 39 and decreasing that on resistance 45. This biases amplifier 48 for operation and so strongly biases the control electrode of device 49 negative with respect to its cathode that this device is inoperative.

On the occurrence of the next positive pulse, this condition is again reversed, the original condition is restored, and so on repeatedly at the beginning of each positive pulse of the square wave. Thus, pulses occur on resistors 35 and 41 at one half of the frequency of the square wave supplied across condenser 53 and resistance 52 and these latter pulses are supplied respectively through the condensers 56 and 57 and amplifiers 55 and 54 to the respective conductors 12, 30 and 11.

The voltage relationships present in the system are better illustrated in Fig. 3 in which the curve 61 may be taken to represent the square wave produced by the squarer 7 of Fig. 1 and which is supplied across condenser 53 and resistance 52 of Fig. 2. By reason of the short time constant of condenser 53 and resistor 52, this square wave is differentiated, thereby producing on the resistance 52 a wave such as that indicated at 62 in Fig. 3. This wave comprises positive pulses 63, one at the beginning of each positive pulse of the wave 61, and negative pulses 64, at the beginning of each negative portion of the wave 61. The negative pulses 64 upon the control electrodes of amplifiers 48 and 49 merely drive these control electrodes more negative and have no effect upon the output circuits thereof. Each positive pulse, however, is amplified by that one of the two devices 48 and 49 having the lower negative grid potential at the time, and thus operates through the anode of such device to reverse the current conditions in the devices 46 and 47. Thus, for example, the current flowing in device 46 may be represented by the curve 65 and that in the device 47 by the curve 66. These latter curves may be taken to represent the voltage on the resistors 35 and 41, respectively, as well as on resistors 36 and 42, the former potentials being supplied through the condensers 56 and 57 and the amplifiers 55 and 54 to the conductors 12 and 30 in the one case, and conductor 11 in the other.

Of course, any positive pulse on the control electrode of amplifiers 48 and 49 tends, by reason of the operation already described, instantaneously to increase the negative bias upon that one of these devices having lower negative bias, and to reduce instantaneously that upon the other. This may cause both devices 48 and 49 to amplify a positive pulse at the same instant. However, resistances 39 and 45 are shunted respectively by condensers 50 and 50' thereby to delay this change in the operating condition of these amplifiers during the duration of any one positive pulse 63. Thus one of the pulses 63 is amplified by one of the two devices 48 and 49 while the next successive pulse 63 is amplified by the other of these two devices. This process repeats indefinitely and produces the square wave pulses in the output of the devices 46 and 47 represented by the curves 65 and 66.

It so happens in the equipment in which we immediately contemplate the use of our invention, and which is shown in Fig. 1, that the square waves produced by the squarer 7 have positive portions of adjustable width, as indicated by the arrow 67 in Fig. 1. This squarer, however, operates to vary the amplitude of these square waves undesirably as the duration of the positive pulses is varied, and it may happen that upon extreme variation of the potential of the square wave that either both of the devices 48 and 49 are rendered conductive simultaneously, or that neither is. Thus, for example, if we assume a bias voltage of 10 volts between the control electrode and cathode of amplifier 49, and 25 volts between the control electrode and cathode of amplifier 48, as previously mentioned, satisfactory operation is had if the received pulses be greater than 10 volts and less than 25. If they be greater than 25, then both amplifiers become conductive, or if they be less than 10, neither amplifier becomes conductive and thus the production of pulses having frequency equal to half of the frequency of the primary wave fails.

Such failure is prevented in the modification of our invention shown in Fig. 4.

The form of our invention shown in Fig. 4 is similar to that shown in Fig. 2, differing therefrom only in that the different discharge devices are shown as each enclosed in individual envelopes, the resistance 41 replaces the resistances 41 and 42 of Fig. 2; the resistance 35 replaces the resistances 35 and 36, and in that a shunt resistance condenser combination comprising resistance 69 and condenser 70, is substituted for resistance 52' in the grid circuit of devices 48 and 49.

The resistance 69 is of high value, as for example, one megohm, and serves, in response to the flow of grid current in either of the two devices 48 and 49, to have a drop in potential thereon which prevents a further rise in potential upon the grids of both devices. Thus, for example, if we assume that the control electrode of device 49 of Fig. 4 is negative with respect to its cathode by 10 volts, and that of device 48 is negative with respect to its cathode by 25 volts, and that a pulse be applied to the two control electrodes of sufficient magnitude to drive the less negative control electrode positive with respect to its associated cathode, then current flows in that control electrode and through resistances 69 and 52 to the cathode. The potential on resistance 69 produced by current in the control electrode of device 49 prevents a further rise in voltage on the grids of both devices 48 and 49 and any further increase in the supplied voltage appears merely as a drop in voltage across resistance 69. Since the cathode of device 48 was positive by 25 volts and its grid cannot become positive by more than the neighborhood of 10 volts, this device remains nonconductive. Thus it is assured that only the device having the lower negative bias transmits to its anode circuit any pulse applied to its control electrode.

It is highly desirable, however, that this resistance 69 be shunted by condenser 70 thereby to avoid loss at high frequencies in resistance 69 and the resultant deterioration of the sharpness of the pulse applied to the control electrodes of devices 48 and 49. Actually the condenser 70 not only preserves the sharpness of the pulses as applied to these control electrodes by bypassing the high frequencies contained in a sharp pulse, but causes the effect of the pulses on the control electrodes to be shortened in time by reason of the sudden accumulation of negative bias on the control electrodes. The time constant of resistance 69 and condenser 70 is too short to maintain any steady bias on the control electrodes, being of the order of 220 microseconds, the resistance, for example, being one megohm and the condenser 220 micromicrofarads. This period is but a small fraction of the period between primary pulses which, for example, may vary from a thousand to two thousand microseconds.

It will of course be understood that the resistance capacity combination 69, 70 may be employed in the circuit of Fig. 2 with equal results. The other changes in the circuit of Fig. 4 over that of Fig. 2 are helpful merely in the use of discharge devices of the type mentioned below.

One set of circuit constants which may be employed is as follows, although it will be understood that these values may be varied widely:

Resistances 35 and 41=.22 megohm
Resistances 37 and 43=1.5 megohms
Resistances 38 and 44=.56 megohm
Resistances 39 and 45=.39 megohm
Resistance 51=68,000 ohms
Resistance 69=1.00 megohm
Resistance 52=.15 megohm
Capacity 70=220 micromicrofarads
Capacities 71 and 72=1,500 micromicrofarads
Capacity 53=220 micromicrofarads Discharge devices 48 and 49 may be in a single envelope and discharge devices 46 and 47 in a single envelope, both of which may be of the 6SN7GT type.

It has been found that the invention as thus described operates with extreme stability to produce a pulse wave having a frequency equal to one half of the frequency of the primary pulses and irrespective of the variation of the amplitude of the primary pulses as long as the amplitude exceeds a certain minimum operating value. We have found that notwithstanding wide variations in the amplitude of such primary pulses, it is unnecessary to provide means for regulating or adjusting the intensity of the voltage supplied to the equipment described, such, for example, as a potentiometer.

The square wave pulses produced by the equipment described have positive portions exactly equal in duration to the negative portions thereof, and these portions are each flat-topped to an extreme degree. The frequency is independent of the duration of the positive portion of the primary pulses 61, Fig. 3, or the intensity thereof, and is always one half of the frequency of the primary pulses, regardless of changes in frequency of said primary pulses, over a wide range of such frequencies.

In the operation of the system it has been found that voltage having half the frequency of the applied voltage is produced over an extremely wide range of frequencies of the applied voltage and without any readjustment of the apparatus. The primary frequency has been varied over a range from eighty cycles to seven thousand cycles and the equipment operated stably and reliably to produce an output voltage having half the frequency of the primary voltage over the entire range. This result was secured without any readjustment of the apparatus.

While we have shown a particular form of our invention and described it by reference to a particular application thereof, it will, of course, be understood that we do not wish to be limited thereto since many modifications both in the circuit arrangement and in the instrumentalities employed may be made, and that we contemplate by the appended claims to cover any such modifications as fall within the true spirit and scope of our invention.

What we claim as new and desire to secure by Letters Patent of the United States is:

1. In combination, a source of pulses, a pair of electron discharge amplifiers each having an anode, a cathode, and a control electrode, means to supply pulses from said source between said control electrode and cathode of both of said amplifiers, and means responsive to current in the anode of either amplifier to render inoperative the respective amplifier and to render the other amplifier operative, whereby adjacent of said pulses in time are amplified by different of said devices, and means responsive to current flowing between the control electrode and cathode of either device during any pulse produced by undesired increase in amplitude of said pulses to bias the control electrode of the other device sufficiently negative with respect to its cathode that said other device is maintained inoperative during said pulse.

2. In combination, a source of pulses of varying amplitude, a pair of electron discharge devices each having an anode, a cathode, and a control electrode, said source being connected between said control electrode and cathode of both of said devices, means responsive to an amplified pulse in the anode of either device to bias the control electrode of the same device sufficiently negative to prevent amplification of a succeeding pulse by said device and to establish an operating bias between the control electrode and cathode of the opposite device, and means to prevent a pulse of undesirably large amplitude from being amplified by both devices, said means comprising means responsive to current in the control electrode of either device to increase the negative bias on the control electrode of the other device.

3. In combination, a source of pulses of varying amplitude, a pair of electron discharge devices each having an anode, a cathode, and a control electrode, said source being connected between said control electrode and cathode of both of said devices, means to vary the bias on said control electrodes oppositely in response to each amplified pulse to render said amplifiers operative alternately, one amplifier being operative during any pulse, and means to prevent a pulse of undesirably large amplitude from overcoming the bias on that one of said amplifiers that is biased to be inoperative, said means comprising means responsive to said pulse of undesirably large amplitude to increase the negative bias on said inoperative amplifier.

4. The combination, in a frequency divider, of a source of operating voltage, a pair of potentiometers connected across said source, a pair of electron discharge devices each having an anode connected to a high potential point of a respective one of said potentiometers, a control electrode connected to a lower potential point on the other potentiometer, and a cathode, said cathodes being connected through a common resistance to the negative side of said source, said resistance being sufficiently high that when current flows in either of said devices the control electrode of the other device is negative relative to the cathode thereof and said other device is non-conductive, a source of pulses to be divided, means responsive to initiation of each pulse of like polarity of said source substantially instantaneously to produce a flow of current through a portion of the potentiometer to which the anode of the non-conductive one of said devices is connected thereby to reduce the voltage on the control electrode of the conductive one of said devices and to render said conducting device non-conducting whereby said non-conducting device becomes conducting this operation occurring at half the frequency of said source, and a load circuit connected to one of said devices to receive said half frequency pulses.

5. The combination, in a frequency divider, of a source of operating voltage, a pair of potentiometers, a pair of electron discharge devices each having an anode connected to a high potential point on a respective one of said potentiometers, a control electrode connected to a lower potential point on the other potentiometer and a cathode, said cathodes being connected through a resistance to the negative side of said source, the potential on said resistance produced by current in either device being such that the control electrode of the other device is negative relative to its associated cathode and said device is non-conductive, a second pair of electron discharge devices, each having a cathode connected to a low potential point of the respective potentiometer and an anode connected to a more positive point on the other potentiometer and a control electrode, and a source of pulses to be divided in frequency connected to both of said control electrodes, whereby each positive pulse of said source renders conductive that device of said second pair having the least negative bias on its control electrode and current flowing therein reverses the conditions of conductivity and non-conductivity in the other two devices said reversals occurring at half the frequency of said source.

SEYMOUR BERKOFF.
ROBERT B. DOME.